(12) United States Patent
Liu et al.

(10) Patent No.: US 12,158,368 B2
(45) Date of Patent: Dec. 3, 2024

(54) METHOD FOR SETTING CALIBRATED OUTFLOW WATER OF QUANTITATIVE OUTFLOW WATER FAUCET, METHOD FOR PROCESSING OUTFLOW WATER, AND FAUCET

(71) Applicant: Zhangzhou Solex Smart Home Co., Ltd., Zhangzhou (CN)

(72) Inventors: Jun Liu, Zhangzhou (CN); Wei Lu, Zhangzhou (CN); Chuanliang Li, Zhangzhou (CN)

(73) Assignee: Zhangzhou Solex Smart Home Co., Ltd., Zhangzhou (CN)

( * ) Notice: Subject to any disclaimer, the term of this patent is extended or adjusted under 35 U.S.C. 154(b) by 261 days.

(21) Appl. No.: 17/986,338

(22) Filed: Nov. 14, 2022

(65) Prior Publication Data
US 2023/0152142 A1    May 18, 2023

(30) Foreign Application Priority Data
Nov. 12, 2021   (CN) .......................... 202111339131.9

(51) Int. Cl.
*G01F 25/10* (2022.01)
*G06F 3/041* (2006.01)

(52) U.S. Cl.
CPC ............ *G01F 25/10* (2022.01); *G06F 3/0416* (2013.01)

(58) Field of Classification Search
None
See application file for complete search history.

(56) References Cited

U.S. PATENT DOCUMENTS

| 5,058,804 A | * | 10/1991 | Yonekubo | .......... G05D 23/1393 236/12.12 |
| 10,072,403 B2 | * | 9/2018 | Shirai | .................... G01S 7/4813 |
| 2018/0355592 A1 | * | 12/2018 | Mandel | .................... E03C 1/055 |

* cited by examiner

*Primary Examiner* — Brandi N Hopkins
*Assistant Examiner* — Nigel H Plumb
(74) *Attorney, Agent, or Firm* — Cooper Legal Group, LLC

(57) ABSTRACT

A method for setting calibrated outflow water of a quantitative outflow water faucet, a method for processing outflow water, and a faucet. The method for setting the calibrated outflow water comprises receiving a touch/press signal, and entering a calibration setting mode; receiving a signal for setting one or more quantitative outflow water gear positions, and obtaining a calibrated outflow water gear position; receiving a touch/press signal of an outflow water control switch, and controlling an outflow water valve to be opened; when a number of rotations of a flow meter reaches an initial set value of the one or more quantitative outflow water gear positions, controlling the outflow water valve to be closed to obtain an actual outflow water quantity; receiving a difference value; setting a calibrated set value of the calibrated outflow water gear position; and exiting the calibration setting mode.

20 Claims, 7 Drawing Sheets

METHOD FOR SETTING CALIBRATED OUTFLOW WATER OF QUANTITATIVE OUTFLOW WATER FAUCET, METHOD FOR PROCESSING OUTFLOW WATER, AND FAUCET

RELATED APPLICATIONS

This application claims priority to Chinese patent application number 202111339131.9, filed on Nov. 12, 2021. Chinese patent application number 202111339131.9 is incorporated herein by reference.

FIELD OF THE DISCLOSURE

The present disclosure relates to the technical field of outflow water control, and in particular relates to a method for setting calibrated outflow water of a quantitative outflow water faucet, and a method for processing outflow water and a faucet.

BACKGROUND OF THE DISCLOSURE

At present, quantitative accuracy of a quantitative outflow water faucet mainly depends on calibration of the process equipment in the factory before the product is shipped. After the calibration, the product is shipped, and users can use the product directly after receiving the product but users cannot adjust the quantitative outflow water faucet by themselves when there are inaccuracies. In addition, after the quantitative outflow water faucet is used for a period of time, there may arise inaccuracies (such as differences in flow meters, waterways, valve bodies, etc., which will affect the accuracy to a certain extent. If some parts are replaced when the product is in use, or some waterways change after long-term use, there may be some differences in the quantitative accuracy. In the absence of the calibration, these errors cannot be corrected), so it is necessary to coordinate with professionals of the manufacturer for maintenance or returning the product to the factory for maintenance. The maintenance process is too cumbersome, and the maintenance cycle is long, affecting user satisfaction.

BRIEF SUMMARY OF THE DISCLOSURE

The main purpose of the present disclosure is to propose a method for setting calibrated outflow water of a quantitative outflow water faucet, a method for processing outflow water, and a faucet, which can calibrate an outflow water quantity of one or more quantitative outflow water gear positions, ensure accuracy of outflow water quantity, and improve user satisfaction.

In order to solve the technical problem, a technical solution of the present disclosure is as follows.

On the one hand, a method for setting the calibrated outflow water of a quantitative outflow water faucet, comprising:
receiving a touch/press signal of an outflow water setting switch, and entering a calibration setting mode;
receiving a signal for setting one or more quantitative outflow water gear positions of a flow quantity selecting switch, and obtaining a corresponding one of the one or more quantitative outflow water gear positions as a calibrated outflow water gear position;
receiving a touch/press signal of an outflow water control switch, and controlling an outflow water valve to be opened; when a number of rotations of a flow meter reaches an initial set value of the one or more quantitative outflow water gear positions, controlling the outflow water valve to be closed to obtain an actual outflow water quantity;
receiving a difference value between a set outflow water quantity of the one or more quantitative outflow water gear positions configured to be input by a user and the actual outflow water quantity; setting a calibrated set value of the calibrated outflow water gear position based on the actual outflow water quantity and the difference value; and
exiting the calibration setting mode.

In a preferred embodiment, the outflow water setting switch and the outflow water control switch are independently arranged.

In a preferred embodiment, the outflow water setting switch and the outflow water control switch are a same switch;
before entering the calibration setting mode, the method further comprises:
judging a duration of the touch/press signal of the outflow water setting switch; and when the duration of the touch/press signal of the outflow water setting switch is greater than or equal to a first duration, entering the calibration setting mode;
before controlling the outflow water valve to be opened, the method further comprises:
judging a duration of the touch/press signal of the outflow water control switch; and when the duration of the touch/press signal of the outflow water control switch is less than a second duration, controlling the outflow water valve to be opened; and
the first duration is greater than or equal to the second duration.

In a preferred embodiment, before setting the calibrated set value of the calibrated outflow water gear position based on the actual outflow water quantity and the difference value, the method further comprises: receiving the touch/press signal of the outflow water setting switch again.

In a preferred embodiment, the outflow water setting switch and the outflow water control switch are a same switch;
before entering the calibration setting mode, the method further comprises:
judging a duration of the touch/press signal of the outflow water setting switch; and when the duration of the touch/press signal of the outflow water setting switch is greater than or equal to a first duration, entering the calibration setting mode;
before controlling the outflow water valve to be opened, the method further comprises:
judging a duration of the touch/press signal of the outflow water control switch; and when the duration of the touch/press signal of the outflow water control switch is less than a second duration, controlling the outflow water valve to be opened;
before exiting the calibration setting mode, the method further comprises:
judging the duration of the touch/press signal of the outflow water setting switch again; and when the duration of the touch/press signal of the outflow water setting switch again is greater than or equal to the first duration, exiting the calibration setting mode; and
the first duration is greater than or equal to the second duration.

In a preferred embodiment, after receiving the touch/press signal of the outflow water setting switch, the method further comprises:

controlling a calibration indicator light to display a first color;

after receiving the signal for setting the one or more quantitative outflow water gear positions of the flow quantity selecting switch, the method further comprises:

controlling the calibration indicator light to display a second color; and the first color is different from the second color.

In a preferred embodiment, after receiving the touch/press signal of the outflow water setting switch, the method further comprises:

controlling a calibration indicator light to display a first color;

after receiving the signal for setting the one or more quantitative outflow water gear positions of the flow quantity selecting switch, the method further comprises:

controlling the calibration indicator light to display a second color;

after receiving the touch/press signal of the outflow water setting switch again, the method further comprises:

controlling the calibration indicator light to display a third color, and at least one of the first color, the second color, or the third color is different from the others of the first color, the second color, and the third color.

In a preferred embodiment, when the actual outflow water quantity is less than the set outflow water quantity of the one or more quantitative outflow water gear positions, the difference value is positive, and when the actual outflow water quantity is greater than the set outflow water quantity of the one or more quantitative outflow water gear positions, the difference value is negative.

In a preferred embodiment, the setting the calibrated set value of the calibrated outflow water gear position based on the actual outflow water quantity and the difference value specifically comprises:

dividing the actual outflow water quantity by the initial set value of the one or more quantitative outflow water gear positions to obtain an actual outflow water quantity when the flow meter rotates for one rotation;

dividing the difference value to obtain an incremental set value by the actual outflow water quantity when the flow meter rotates for one rotation; and adding the initial set value of the one or more quantitative outflow water gear positions to the incremental set value to obtain the calibrated set value, and setting the calibrated set value.

On the another hand, a method for calibrating outflow water of the quantitative outflow water faucet, based on the method for setting the calibrated outflow water, comprising:

receiving the one or more quantitative outflow water gear positions set by the flow quantity selecting switch;

judging whether the one or more quantitative outflow water gear positions is the calibrated outflow water gear position; when the quantitative outflow water gear is the calibrated outflow water gear position, controlling the outflow water valve to be opened after receiving the touch/press signal of the outflow water control switch; and when the number of rotations of the flow meter reaches the calibrated set value, controlling the outflow water valve to be closed.

On the more another hand, an outflow water faucet, comprising: an outflow water setting switch, an outflow water control switch, a flow quantity selecting switch, and a program control module;

the flow quantity selecting switch comprises a quantitative ring, the quantitative ring comprises a plurality of quantitative outflow water gear positions, and each of the plurality of quantitative outflow water gear positions is correspondingly disposed with an induction magnet;

the program control module comprises an outflow water valve, a flow meter, and a control chip, and the induction magnet is magnetically connected to a Hall sensor on the control chip;

the control chip is connected to the outflow water setting switch to receive a touch/press signal of the outflow water setting switch to enter a calibration setting mode, so as to set the plurality of quantitative outflow water gear positions selected by the flow quantity selecting switch as a calibrated outflow water gear position;

the outflow water control switch is connected to the control chip, after the calibrated outflow water gear position is selected through the flow quantity selecting switch, the control chip controls the outflow water valve to be opened after receiving a touch/press signal of the outflow water control switch, when a number of rotations of the flow meter reaches an initial set value, the control chip controls the outflow water valve to be closed, and an actual outflow water quantity and a difference value between a set outflow water quantity of the one of the plurality of quantitative outflow water gear positions and the actual outflow water quantity are obtained, so that the calibrated outflow water gear position is set based on the actual outflow water quantity and the difference value.

In a preferred embodiment, the outflow water setting switch and the outflow water control switch are independently arranged, or the outflow water setting switch and the outflow water control switch are a same switch.

In a preferred embodiment, the outflow water faucet further comprises a calibration module for inputting the difference value; the calibration module comprises a positive difference value setting switch for increasing an outflow water quantity and a negative difference value setting switch for reducing the outflow water quantity, or the calibration module comprises a touch screen.

Compared with the existing techniques, the technical solution has the following advantages.

(1) The present disclosure enters the calibration setting mode by receiving the touch/press signal of the outflow water setting switch and controls the outflow water valve to be opened by receiving the touch/press signal of the outflow water control switch after the flow quantity selecting switch rotates to one of the one or more quantitative outflow water gear positions. When the number of rotations of the flow meter reaches the initial set value of the one or more quantitative outflow water gear positions, the outflow water valve is controlled to be closed, the actual outflow water quantity is obtained, and the difference value between the set outflow water quantity of the one or more quantitative outflow water gear positions configured to be input by the user and the actual outflow water quantity is received for calibration, so as to ensure accurate outflow water quantity of the quantitative outflow water faucet and improve user satisfaction.

(2) The outflow water setting switch and the outflow water control switch of the present disclosure can be set independently, or alternatively, outflow water setting switch and the outflow water control switch can also be the same switch. When outflow water setting switch and the outflow water control switch are the same switch, the one or more quantitative outflow water gear positions (i.e., calibrated outflow water gear position) can be distinguished by the touch/press duration) to calibrate or control the outflow water quantity.

(3) The method for setting calibrated outflow water of the present disclosure can exit the calibration setting mode after receiving the difference value input by the calibration module, which simplifies the operation steps. In order to prevent false reset, the calibration setting mode can be exited when the touch/press signal of the outflow water setting switch is received again.

(4) The present disclosure indicates the current operation through the calibration indicator light, giving users an intuitive prompt, preventing operation error, and further improving user satisfaction.

The above description is only an overview of the technical solution of the present disclosure in order to enable the technical means of the present disclosure to be more clearly understood, so that it can be implemented according to the content of the description. The detailed description of the embodiments of the present disclosure are listed below in order to enable the above and other objectives, features, and advantages of the present disclosure to be more easily understood.

The above and other objectives, advantages, and features of the present disclosure will be more apparent to those skilled in the art in combination with the accompanying drawings and the detailed description of the embodiments of the present disclosure described below.

BRIEF DESCRIPTION OF THE DRAWINGS

FIGS. 3A-3B illustrate a first step for setting the outflow water calibration of the embodiment of the present disclosure, wherein FIG. 3A represents an operation step and FIG. 3B represents an operation result.

FIGS. 4A-4B illustrate a second step for setting the outflow water calibration of the embodiment of the present disclosure, wherein FIG. 4A represents an operation step and FIG. 4B represents an operation result.

FIGS. 5A-5B illustrate a third step for setting the outflow water calibration of the embodiment of the present disclosure, wherein FIG. 5A represents an operation step and FIG. 5B represents an operation result.

FIGS. 7A-7B illustrate a fifth step for setting the outflow water calibration of the embodiment of the present disclosure, wherein FIG. 7A represents an operation step and FIG. 7B represents an operation result.

DETAILED DESCRIPTION OF THE EMBODIMENTS

In order to further clarify objectives, technical features, and advantages of the present disclosure, the embodiments of the present disclosure will be further described below in combination with the drawings.

Figure 1:
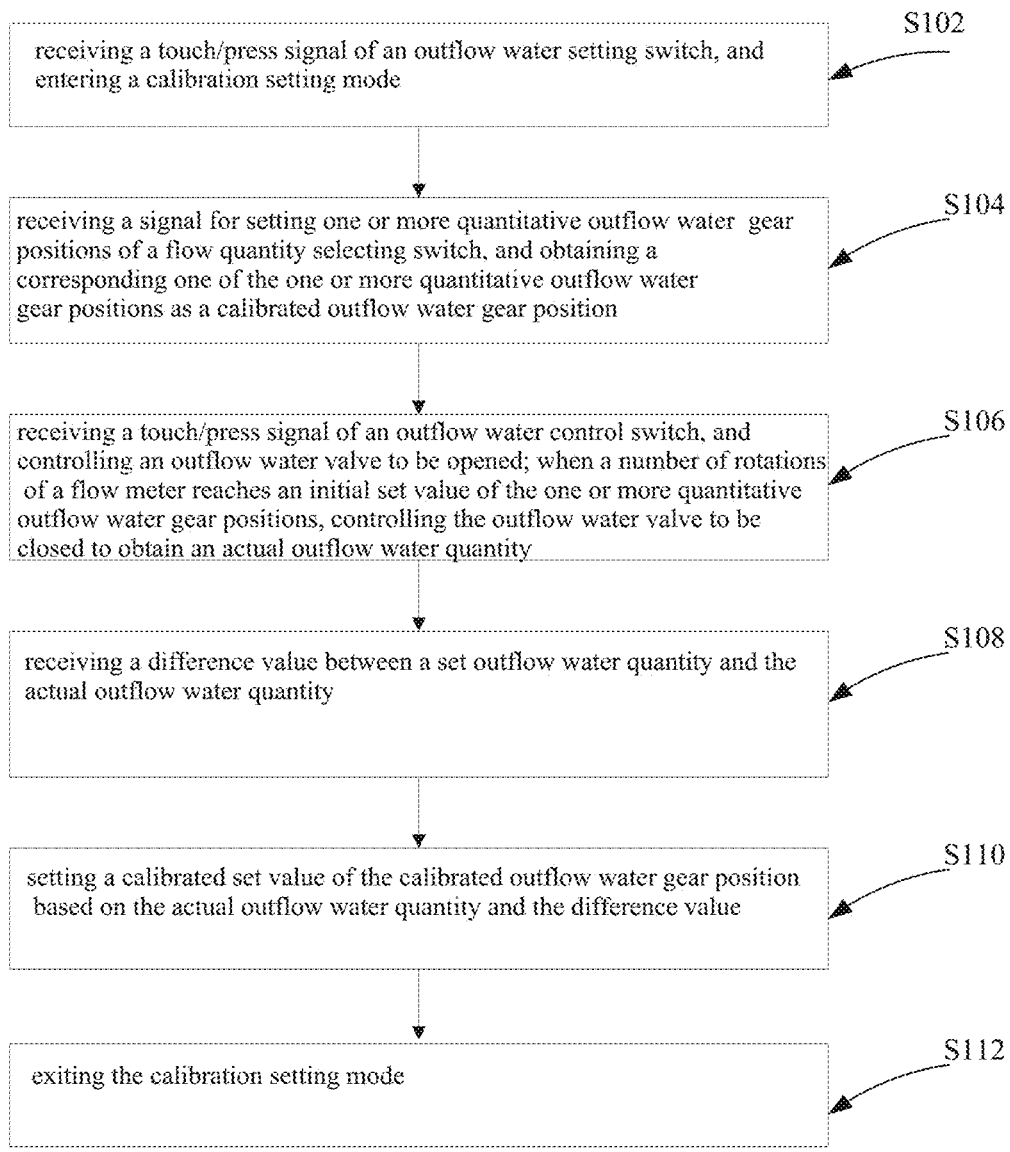
FIG. 1 illustrates a first flowchart of a method for setting calibrated outflow water of a quantitative outflow water faucet of an embodiment of the present disclosure.

Referring to FIG. 1, a method for setting calibrated outflow water of a quantitative outflow water faucet of the present disclosure comprises:

S102: receiving a touch/press signal of an outflow water setting switch, and entering a calibration setting mode;

S104: receiving a signal for setting one or more quantitative outflow water gear positions of a flow quantity selecting switch, and obtaining a corresponding one of the one or more quantitative outflow water gear positions as a calibrated outflow water gear position;

S106: receiving a touch/press signal of an outflow water control switch, and controlling an outflow water valve to be opened; when a number of rotations of a flow meter reaches an initial set value of the one or more quantitative outflow water gear positions, controlling the outflow water valve to be closed to obtain an actual outflow water quantity;

S108: receiving a difference value between a set outflow water quantity of the one or more quantitative outflow water gear positions configured to be input by the user and the actual outflow water quantity;

S110: setting a calibrated set value of a calibrated outflow water gear position based on the actual outflow water quantity and the difference value; and S112: exiting the calibration setting mode.

In the method for setting calibrated outflow water of a quantitative outflow water faucet of the embodiment, an execution body may be a control chip of the quantitative outflow water faucet, and a processor is integrated on the control chip.

In this embodiment, the calibration setting mode is entered by receiving the touch/press signal of the outflow water setting switch. After the flow quantity selecting switch rotates to one of the one or more quantitative outflow water gear positions, the outflow water valve is controlled to be opened by receiving the touch/press signal of the outflow water control switch. When the number of the rotations of the flow meter reaches the initial set value of the one or more quantitative outflow water gear positions, the outflow water valve is controlled to be closed, an actual outflow water quantity is obtained, and a difference value between the set outflow water quantity of the one or more quantitative outflow water gear positions configured to be input by the user and the actual outflow water quantity is received to perform the calibration to ensure accurate outflow water from the quantitative outflow water faucet and improve user satisfaction.

Figure 2:
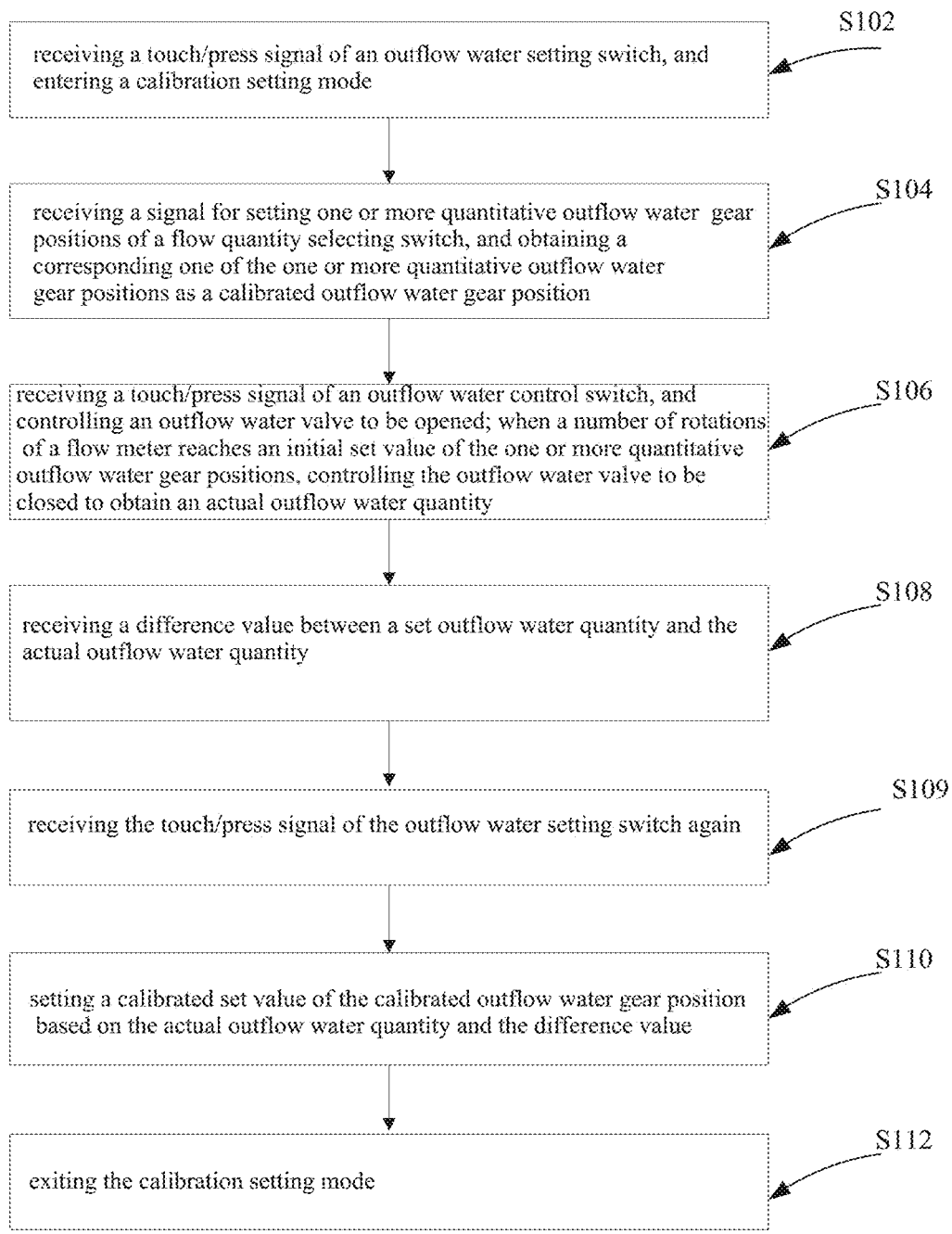
FIG. 2 illustrates a second flowchart of the method for setting calibrated the outflow water of the quantitative outflow water faucet of the embodiment of the present disclosure.
Figure 3A:
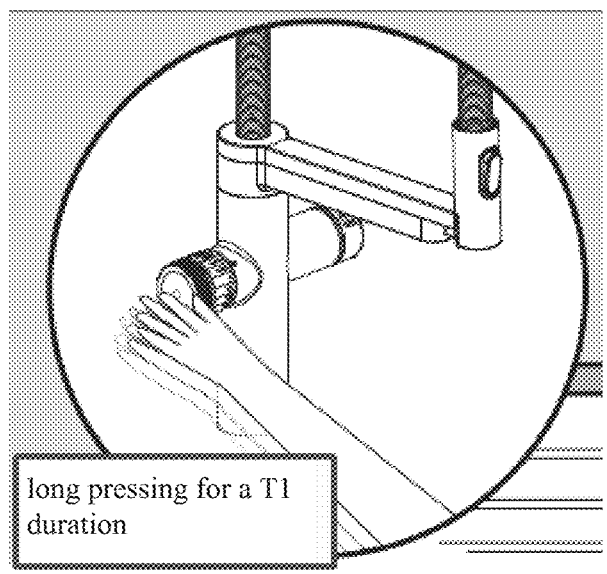
Figure 3B:
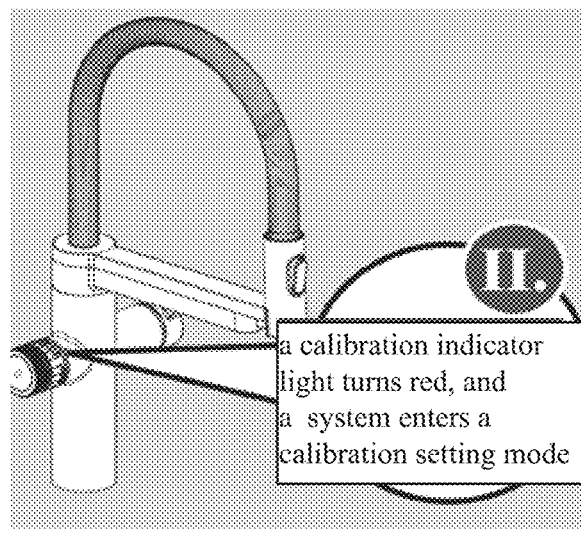
Figure 4A:
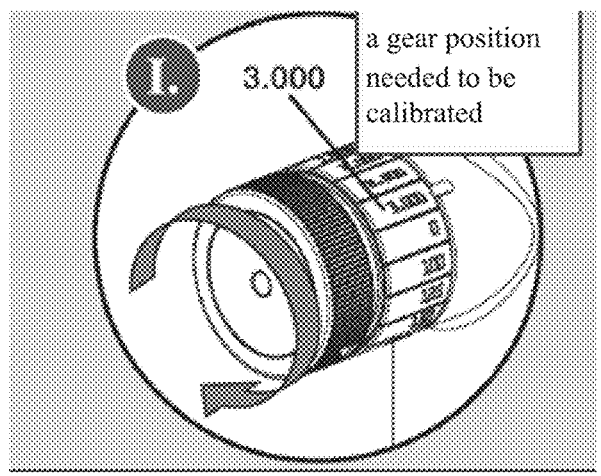
Figure 4B:
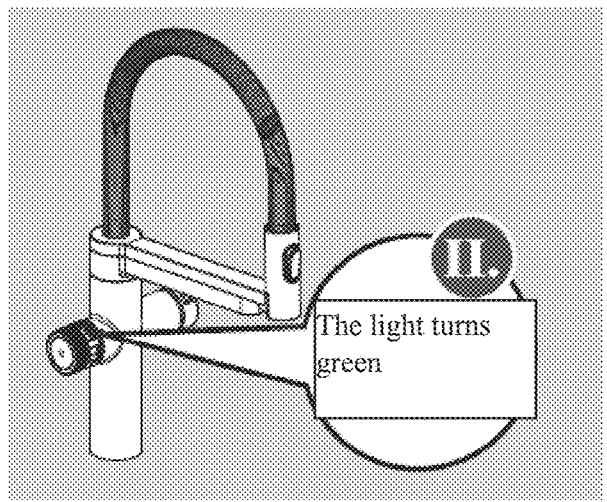
Figure 5A:
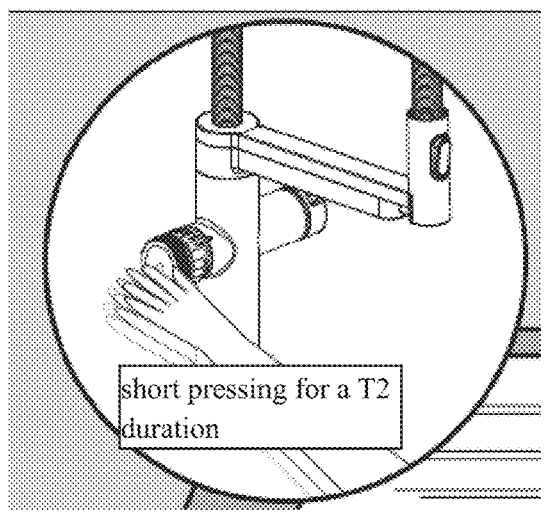
Figure 5B:
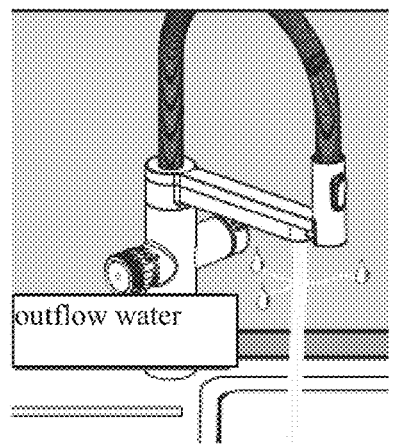
Figure 6:
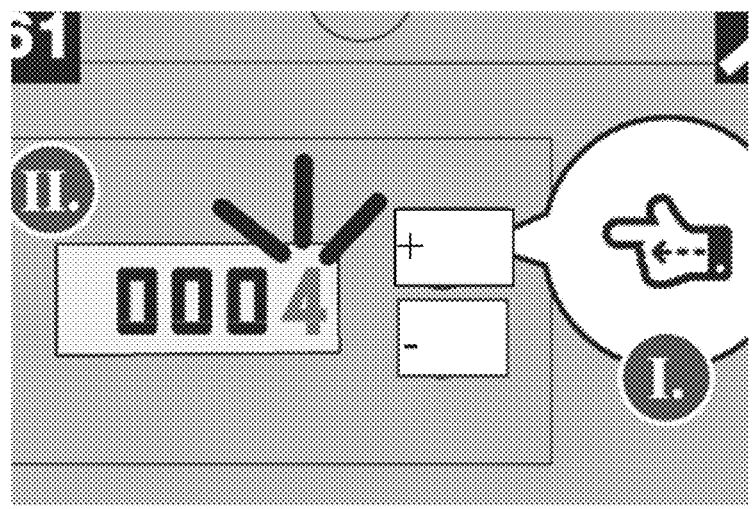
FIG. 6 illustrates a fourth step for setting the outflow water calibration of the embodiment of the present disclosure.
Figure 7A:
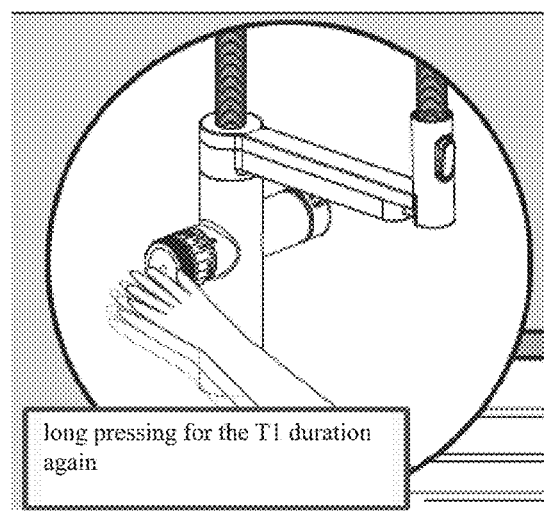
Figure 7B:
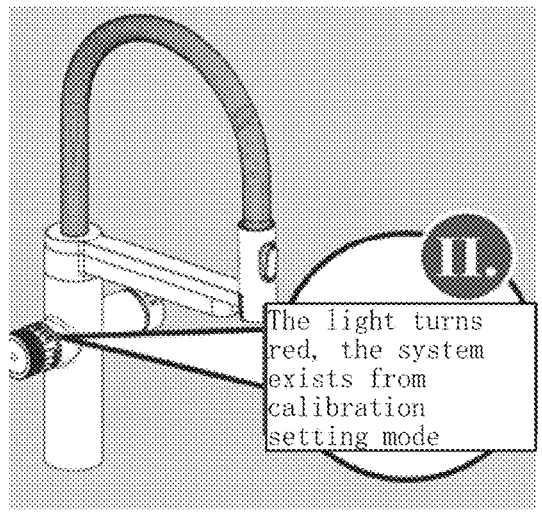

Referring to FIG. 2, in another embodiment, before setting the calibrated set value of the calibrated outflow water gear position based on the actual outflow water quantity and the difference value, the method further comprises:

S109: receiving the touch/press signal of the outflow water setting switch again.

Referring to FIG. 1, after the calibrated set value of the calibrated outflow water gear position is set based on the actual outflow water quantity and the difference value, the method for setting calibrated outflow water of the present disclosure can exit the calibration setting mode to simplify the operation steps. In order to prevent a false reset, the calibration setting mode can be exited when the touch/press signal of the outflow water setting switch is received again.

Specifically, the flow quantity selecting switch comprises a quantitative ring disposed on one side of an outflow water end of the quantitative outflow water faucet, and the quantitative ring comprises a plurality of flow quantity measuring scales. Each of the plurality of flow quantity measuring scales corresponds to one of the one or more quantitative outflow water gear positions. The outflow water end of the quantitative outflow water faucet has an indicator. When the calibration setting mode is not entered and the quantitative ring rotates to enable a scale of the plurality of flow quantity measuring scales to be aligned with the indicator, the set outflow water quantity that is currently selected is indicated. For example, when the quantitative ring rotates to enable a scale "2" of the plurality of flow quantity measuring scales to be aligned with the indicator, the set outflow water quantity that is currently selected is indicated to be 2 L. When a setting of the one or more quantitative outflow water gear positions is complete, the control chip can calculate the number of required rotations of the flow meter, that is, the initial set value of the one of the one or more quantitative outflow water gear positions. Specifically, according to the factory settings of the flow meter, an outflow water quantity of the flow meter for one rotation of the flow meter is fixed, such as 100 mL, so that the initial set value of the one of the one or more quantitative outflow water gear positions is 20 rotations. However, after a period of use, the quantitative outflow water faucet may be inaccurate, such as the scenario described in the background, and this may cause the outflow water quantity of the one rotation of the flow meter to change.

The actual outflow water quantity can be counted by means of an external container or equipment. Specifically, after the outflow water valve is opened, water is received through the external container. After the outflow water valve is closed, a quantity of the water in the external container is measured, and the difference value between the set outflow water quantity of the one or more quantitative outflow water gear positions and the actual outflow water quantity is calculated. Specifically, statistics can be manually performed, or the statistics can be realized through sensors, and the actual outflow water quantity can be fed back to the control chip.

It should be noted that, during actual calibration, each of the one or more quantitative outflow water gear positions can be calibrated in turn according to the above setting method to achieve calibration of the quantitative outflow water faucet as a whole. Alternatively, after any one of the one or more quantitative outflow water gear positions is calibrated, the other of the one or more quantitative outflow water gear positions can be calibrated based on an actual outflow water quantity of the one rotation of the flow meter.

In an embodiment, the outflow water setting switch and the outflow water control switch are independently arranged. That is, the outflow water setting switch and the outflow water control switch are disposed at different positions of the quantitative outflow water faucet and can be controlled separately at the same time. When the outflow water setting switch and the outflow water control switch are independently arranged, touch/press duration does not need to be considered. As long as there is a touch/press action on the outflow water setting switch or the outflow water control switch, a control command will be triggered.

It should be noted that, although the steps in this embodiment include "receiving a touch/press signal of an outflow water setting switch, and entering a calibration setting mode" occurs first, and then "receiving a signal for setting one or more quantitative outflow water gear positions of a flow quantity selecting switch" occurs, in actual implementation, the steps can be reversed such that "receiving a signal for setting one or more quantitative outflow water gear positions of a flow quantity selecting switch" occurs first, and then "receiving a touch/press signal of an outflow water setting switch, and entering a calibration setting mode" occurs. There is no specific limitation in this embodiment.

In another embodiment, in order to save costs and simplify the steps, the outflow water setting switch and the outflow water control switch can be set as a same switch, and the processor distinguishes whether the same switch is used for the outflow water setting switch or for the outflow water control switch through different touch/press durations. The specific method is as follows.

Before entering the calibration setting mode, the method further comprises:

judging a duration of the received touch/press signal of the outflow water setting switch; when the duration is greater than or equal to a first duration, entering the calibration setting mode;

before controlling the outflow water valve to be opened, the method further comprises:

judging a duration of the received touch/press signal of the outflow water control switch; when the duration is less than a second duration, controlling the outflow water valve to be opened;

before exiting the calibration setting mode, the method further comprises:

judging the duration of the received touch/press signal of the outflow water setting switch; when the duration is greater than or equal to the first duration, exiting the calibration setting mode;

wherein, the first duration is greater than or equal to the second duration.

It should be noted that, in other embodiments, the same switch functions as the outflow water setting switch by being pressed for a short duration and functions as the outflow water control switch by being pressed for a long duration (i.e., the long duration is greater than the short duration). The specific methods are as follows.

Before entering the calibration setting mode, the method further comprises:

judging a duration of the received touch/press signal of the outflow water setting switch; when the duration is less than a second duration, entering the calibration setting mode;

before controlling the outflow water valve to be opened, the method further comprises:

judging a duration of the received touch/press signal of the outflow water control switch; when the duration is greater than or equal to a first duration, controlling the outflow water valve to be opened;

before exiting the calibration setting mode, the method further comprises:

judging the duration of the received touch/press signal of the outflow water setting switch; when the duration is less than the second duration, exiting the calibration setting mode;

wherein, the first duration is greater than or equal to the second duration.

In this embodiment, after receiving the touch/press signal of the outflow water setting switch, the method further comprises:

controlling a calibration indicator light to display a first color;

after receiving the signal for setting the one or more quantitative outflow water gear positions of the flow quantity selecting switch, the method further comprises:

controlling the calibration indicator light to display a second color;

after receiving the touch/press signal of the outflow water setting switch again, the method further comprises:

controlling the calibration indicator light to display a third color.

Specifically, the first color, the second color, and the third color are all different. Alternatively, the first color and the third color are the same, and the second color is different from the first color and the third color.

In an embodiment, when the actual outflow water quantity is less than the set outflow water quantity of the one or more quantitative outflow water gear positions, the difference value is positive, and correspondingly, the calibrated set value is greater than the initial set value. When the actual outflow water quantity is greater than the set outflow water quantity of the one or more quantitative outflow water gear positions, the difference value is negative, and correspondingly, the calibrated set value is smaller than the initial set value.

The setting the calibrated set value of the calibrated outflow water gear position based on the actual outflow water quantity and the difference value specifically comprises:

dividing the actual outflow water quantity by the initial set value of the one or more quantitative outflow water gear positions to obtain an actual outflow water quantity when the flow meter rotates for one rotation;

dividing the difference value by the actual outflow water quantity when the flow meter rotates for one rotation to obtain an incremental set value; and adding the initial set value of the one or more quantitative outflow water gear positions to the incremental set value to obtain the calibrated set value, and setting the calibrated set value.

Specifically, when the set outflow water quantity of the one or more quantitative outflow water gear positions is 2 L, the initial set value of the one or more quantitative outflow water gear positions is 20 rotations. When the actual outflow water quantity is 2.1 L, the actual outflow water quantity is greater than the set outflow water quantity. At this time, a negative value needs to be input. For example, the difference value that is −0.1 is input, and the control chip will calculate the calibrated set value as (20-(0.1/(2.1/20)) rotations. When the one or more quantitative outflow water gear positions are selected subsequently and after the outflow water valve is controlled to be opened for outflow water, the outflow water valve is controlled to be closed when the number of rotations of the flow meter reaches the calibrated set value. When the set outflow water quantity of the one or more quantitative outflow water gear positions is 2 L and the actual outflow water quantity is 1.8 L, the actual outflow water quantity is less than the set outflow water quantity. At this time, a positive value needs to be input. For example, when the difference value of 0.2 is input, the control chip will calculate the calibrated set value as (20+(0.2/(1.8/20)) rotations. When the one or more quantitative outflow water gear positions are selected subsequently and after the outflow water valve is controlled to be opened for outflow water, the outflow water valve is controlled to be closed when the number of rotations of the flow meter reaches the calibrated set value.

Referring to FIG. 3 to FIG. 7, steps for setting calibrated outflow water of an embodiment of the present disclosure comprise:

Step 1: long pressing the outflow water setting switch for a T1 duration (i.e., the first duration) to enable the calibration indicator light to turn red, and a system enters the calibration setting mode;

Step 2: rotating the quantitative ring (i.e., the flow quantity selecting switch) to a gear position to be calibrated to enable the calibration indicator light to turn blue;

Step 3: short pressing the outflow water control switch for a T2 duration (i.e., the second duration) to control the outflow water;

Step 4: after water quantity sensed by the flow meter reaches the one or more quantitative outflow water gear positions set by the flow quantity selecting switch, controlling the outflow water valve to be closed to obtain the actual outflow water quantity, and judging the difference value between the set outflow water quantity of the one or more quantitative outflow water gear positions and the actual outflow water quantity. When the difference value is not zero, obtaining a difference value to be calibrated (such as touching "+" or "−" in the figure, each touch increases or decreases a corresponding increment, a total adjustment amount is displayed on a display device, referring to "0004" in the figure, a unit of an input value can be mL or L, which can be specifically set as needed); and Step 5: long pressing the outflow water setting switch for the T1 duration (i.e., the first duration) to enable the calibration indicator light to turn red, and the system exits the calibration setting mode.

Figure 8:
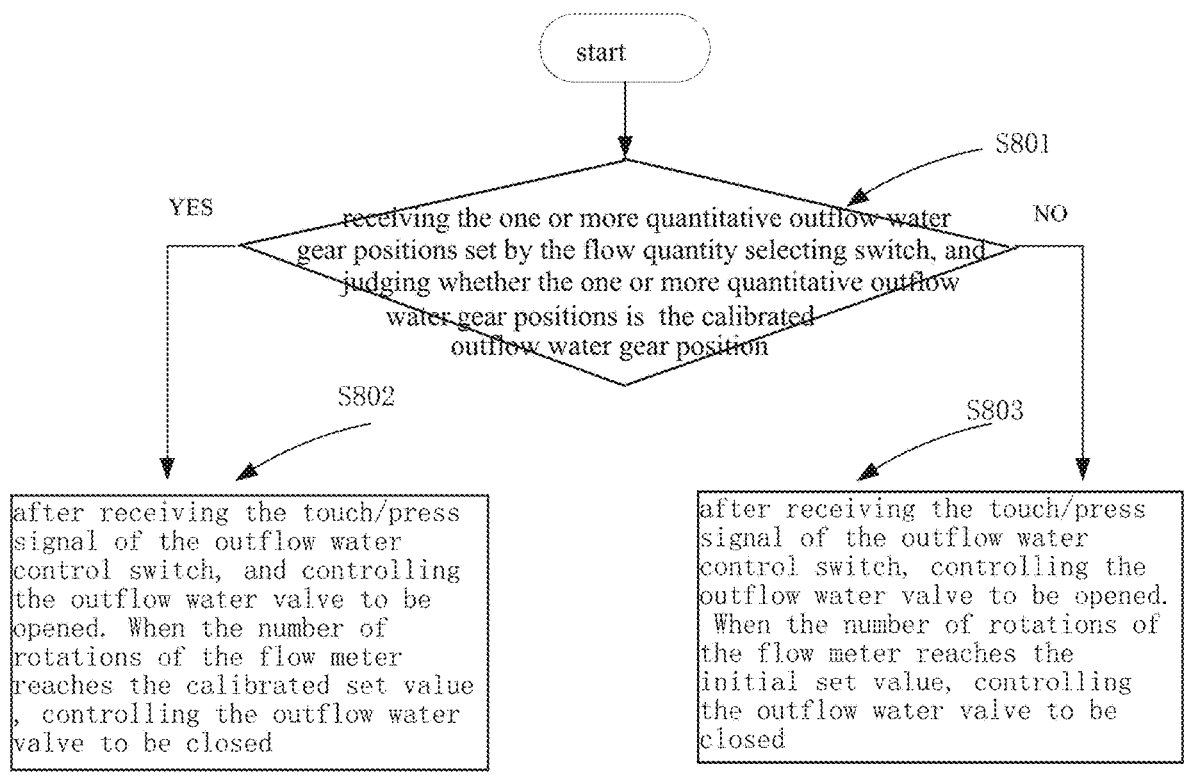
FIG. 8 is a flow chart of a method for calibrating outflow water of the embodiment of the present disclosure.

Referring to FIG. 8, a method for calibrating outflow water of the quantitative outflow water faucet, based on the method for setting calibrated outflow water, comprises:

S801: receiving the one or more quantitative outflow water gear positions set by the flow quantity selecting switch, and judging whether the one or more quantitative outflow water gear positions is the calibrated outflow water gear position; if so, going to S802; otherwise, going to S803;

S802: after receiving the touch/press signal of the outflow water control switch, and controlling the outflow water valve to be opened. When the number of rotations of the flow meter reaches the calibrated set value, controlling the outflow water valve to be closed; and S803: after receiving the touch/press signal of the outflow water control switch, controlling the outflow water valve to be opened. When the number of rotations of the flow meter reaches the initial set value, controlling the outflow water valve to be closed.

Figure 9:
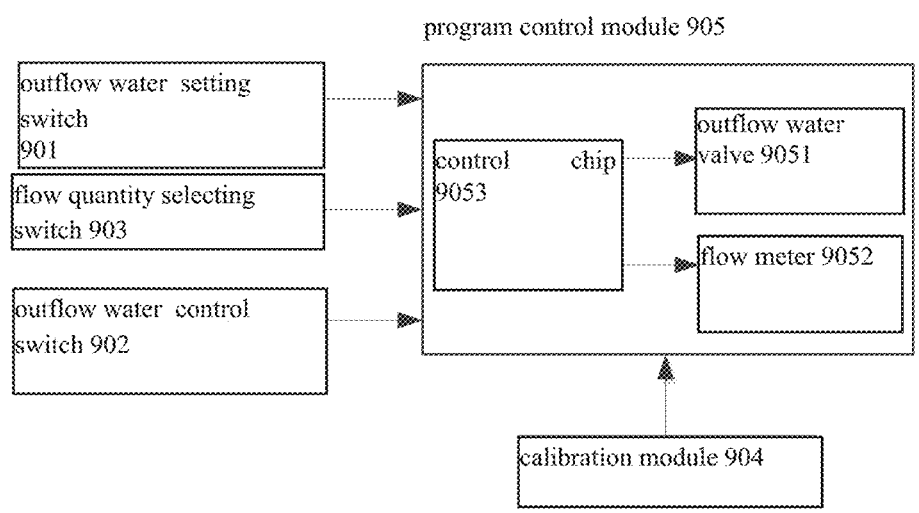
FIG. 9 is a structural block diagram of an outflow water faucet of the embodiment of the present disclosure.

Referring to FIG. 9, an outflow water faucet comprises the outflow water setting switch 901, the outflow water control switch 902, the flow quantity selecting switch 903, a calibration module 904, and a program control module 905.

The flow quantity selecting switch 903 comprises the quantitative ring, and the quantitative ring comprises a plurality of quantitative outflow water gear positions. Each of the plurality of quantitative outflow water gear positions is correspondingly disposed with an induction magnet.

The program control module 905 comprises the outflow water valve 9051, the flow meter 9052, and the control chip 9053. The induction magnet is magnetically connected to a Hall sensor on the control chip 9053.

The control chip 9053 is connected to the outflow water setting switch 901 to receive the touch/press signal of the outflow water setting switch 901 to enter the calibration setting mode, so as to set the one or more quantitative outflow water gear positions selected by the flow quantity selecting switch 903 as the calibrated outflow water gear position.

The outflow water control switch 902 is connected to the control chip 9053. After the calibrated outflow water gear position is selected through the flow quantity selecting switch 903, the control chip 9053 controls the outflow water valve 9051 to be opened after receiving the touch/press signal of the outflow water control switch 902. When the number of rotations of the flow meter 9052 reaches the calibrated set value, the control chip 9053 controls the outflow water valve 9051 to be closed. The actual outflow water quantity and the difference value between the set outflow water quantity of the one of the one or more quantitative outflow water gear positions and the actual outflow water quantity are obtained, so that the calibrated outflow water gear position is set based on the actual outflow water quantity and the difference value. The difference value is input through the calibration module 904.

In this embodiment, the outflow water setting switch 901 and the outflow water control switch 902 are set independently. Alternatively, the outflow water setting switch 901 and the outflow water control switch 902 are set as the same switch.

Specifically, the outflow water setting switch 901 and the outflow water control switch 902 are touch-sensitive switches or mechanical switches. When the outflow water setting switch 901 and the outflow water control switch 902 are the touch-sensitive switches, the touch-sensitive switches can be triggered by touching, and the touch-sensitive switches can be infrared touch switches, capacitive touch switches, etc. When the outflow water setting switch 901 and the outflow water control switch 902 are mechanical switches, the mechanical switches can be triggered by pressing.

In one embodiment, the calibration module 904 comprises a positive difference value setting switch for increasing an outflow water quantity and a negative difference value setting switch for reducing the outflow water quantity.

Specifically, the positive difference value setting switch and the negative difference value setting switch are touch-sensitive switches or mechanical switches. When the positive difference value setting switch and the negative difference value setting switch are touch-sensitive switches, the touch-sensitive switches can be triggered by touching, and the touch-sensing switches can be infrared touch switches, capacitive touch switches, etc. When the positive difference value setting switch and the negative difference value setting switch are mechanical switches, the mechanical switches can be triggered by pressing.

In another embodiment, the calibration module 904 comprises a touch screen. A corresponding difference value can be directly selected through the touch screen, or the difference value can be directly input.

In this embodiment, the outflow water faucet comprises a water faucet or a shower. The method for setting calibrated outflow water and the method for calibrating outflow water are implemented according to the description described above and will not be repeatedly described in this embodiment.

The present application describes a plurality of embodiments, but the description is illustrative rather than limiting and it will be apparent to a person having ordinary skill in the art that a scope within the embodiments described herein can cover more embodiments and implementations. Although many possible combinations of features are shown in the drawings and discussed in the detailed description of the embodiments, many other combinations of the disclosed features are possible. Any feature or element of any embodiment may be used in combination with any other feature or element in any other embodiment or instead of any other feature or element in any other embodiment, unless expressly limited otherwise.

The present disclosure includes and contemplates combinations of features and elements known to a person having ordinary skill in the art. The embodiments, features, and elements disclosed in the present disclosure may also be combined with any conventional features or elements to form a unique technical solution as defined by the claims. Any feature or element of any embodiment may also be combined with features or elements from other technical solutions to form yet another unique technical solution, as defined by the claims. Thus, it should be understood that any of the features shown and/or discussed in this present disclosure may be implemented alone or in any adaptable combination. Accordingly, the embodiments are not limited except as provided by the attached claims and their equivalents. Furthermore, various modifications and changes may be made within the scope of the attached claims.

Further, in describing representative embodiments, the specification may have presented the method and/or the process as a particular sequence of steps. However, the method or the process should not be limited to the particular sequence of steps described to the extent that the method or the process does not rely on the particular sequence of steps set forth herein. Other sequences of steps are possible as should be understood by a person having ordinary skill in the art. Therefore, the particular sequence of the steps set forth in the specification should not be explained as limitations according to the claims. Further, the claims directed to the method and/or the process should not be limited that their steps are performed in the written sequence, and those skilled in the art should readily understand that the sequence may be varied and still maintain the spirit and the scope of the embodiments of the present disclosure.

What is claimed is:

1. A method for setting the calibrated outflow water of a quantitative outflow water faucet, comprising:
    receiving a touch/press signal of an outflow water setting switch, and entering a calibration setting mode;
    receiving a signal for setting one or more quantitative outflow water gear positions of a flow quantity selecting switch, and obtaining a corresponding one of the one or more quantitative outflow water gear positions as a calibrated outflow water gear position;
    receiving a touch/press signal of an outflow water control switch, and controlling an outflow water valve to be opened; when a number of rotations of a flow meter reaches an initial set value of the one or more quantitative outflow water gear positions, controlling the outflow water valve to be closed to obtain an actual outflow water quantity;
    receiving a difference value between a set outflow water quantity of the one or more quantitative outflow water gear positions configured to be input by a user and the actual outflow water quantity;
    setting a calibrated set value of the calibrated outflow water gear position based on the actual outflow water quantity and the difference value; and
    exiting the calibration setting mode.

2. The method for setting the calibrated outflow water of the quantitative outflow water faucet according to claim 1, wherein the outflow water setting switch and the outflow water control switch are independently arranged.

3. The method for setting the calibrated outflow water of the quantitative outflow water faucet according to claim 1, wherein:
the outflow water setting switch and the outflow water control switch are a same switch, before entering the calibration setting mode, the method further comprises:
judging a duration of the touch/press signal of the outflow water setting switch; and
when the duration of the touch/press signal of the outflow water setting switch is greater than or equal to a first duration, entering the calibration setting mode,
before controlling the outflow water valve to be opened, the method further comprises:
judging a duration of the touch/press signal of the outflow water control switch; and
when the duration of the touch/press signal of the outflow water control switch is less than a second duration, controlling the outflow water valve to be opened; and
the first duration is greater than or equal to the second duration.

4. The method for setting the calibrated outflow water of the quantitative outflow water faucet according to claim 1, wherein:
before setting the calibrated set value of the calibrated outflow water gear position based on the actual outflow water quantity and the difference value, the method further comprises:
receiving the touch/press signal of the outflow water setting switch again.

5. The method for setting the calibrated outflow water of the quantitative outflow water faucet according to claim 4, wherein:
the outflow water setting switch and the outflow water control switch are a same switch,
before entering the calibration setting mode, the method further comprises:
judging a duration of the touch/press signal of the outflow water setting switch; and
when the duration of the touch/press signal of the outflow water setting switch is greater than or equal to a first duration, entering the calibration setting mode,
before controlling the outflow water valve to be opened, the method further comprises:
judging a duration of the touch/press signal of the outflow water control switch; and
when the duration of the touch/press signal of the outflow water control switch is less than a second duration, controlling the outflow water valve to be opened,
before exiting the calibration setting mode, the method further comprises:
judging the duration of the touch/press signal of the outflow water setting switch again; and
when the duration of the touch/press signal of the outflow water setting switch again is greater than or equal to the first duration, exiting the calibration setting mode, and
the first duration is greater than or equal to the second duration.

6. The method for setting the calibrated outflow water of the quantitative outflow water faucet according to claim 1, wherein:
after receiving the touch/press signal of the outflow water setting switch, the method further comprises:
controlling a calibration indicator light to display a first color,
after receiving the signal for setting the one or more quantitative outflow water gear positions of the flow quantity selecting switch, the method further comprises:
controlling the calibration indicator light to display a second color, and
the first color is different from the second color.

7. The method for setting the calibrated outflow water of the quantitative outflow water faucet according to claim 4, wherein:
after receiving the touch/press signal of the outflow water setting switch, the method further comprises:
controlling a calibration indicator light to display a first color,
after receiving the signal for setting the one or more quantitative outflow water gear positions of the flow quantity selecting switch, the method further comprises:
controlling the calibration indicator light to display a second color,
after receiving the touch/press signal of the outflow water setting switch again, the method further comprises:
controlling the calibration indicator light to display a third color, and
at least one of the first color, the second color, or the third color is different from the others of the first color, the second color, and the third color.

8. The method for setting the calibrated outflow water of the quantitative outflow water faucet according to claim 1, wherein:
when the actual outflow water quantity is less than the set outflow water quantity of the one or more quantitative outflow water gear positions, the difference value is positive, and
when the actual outflow water quantity is greater than the set outflow water quantity of the one or more quantitative outflow water gear positions, the difference value is negative.

9. The method for setting the calibrated outflow water of the quantitative outflow water faucet according to claim 8, wherein:
the setting the calibrated set value of the calibrated outflow water gear position based on the actual outflow water quantity and the difference value specifically comprises:
dividing the actual outflow water quantity by the initial set value of the one or more quantitative outflow water gear positions to obtain an actual outflow water quantity when the flow meter rotates for one rotation;
dividing the difference value to obtain an incremental set value by the actual outflow water quantity when the flow meter rotates for one rotation; and
adding the initial set value of the one or more quantitative outflow water gear positions to the incremental set value to obtain the calibrated set value, and setting the calibrated set value.

10. A method for calibrating outflow water of the quantitative outflow water faucet, based on the method for setting the calibrated outflow water according to claim 1, comprising:
receiving the one or more quantitative outflow water gear positions set by the flow quantity selecting switch;

judging whether the one or more quantitative outflow water gear positions is the calibrated outflow water gear position;

when the quantitative outflow water gear is the calibrated outflow water gear position, controlling the outflow water valve to be opened after receiving the touch/press signal of the outflow water control switch; and when the number of rotations of the flow meter reaches the calibrated set value, controlling the outflow water valve to be closed.

11. An outflow water faucet, comprising:
an outflow water setting switch,
an outflow water control switch,
a flow quantity selecting switch, and
a program control module, wherein:
  the flow quantity selecting switch comprises a quantitative ring,
  the quantitative ring comprises a plurality of quantitative outflow water gear positions,
  each of the plurality of quantitative outflow water gear positions is correspondingly disposed with an induction magnet,
  the program control module comprises an outflow water valve, a flow meter, and a control chip,
  the induction magnet is magnetically connected to a Hall sensor on the control chip,
  the control chip is connected to the outflow water setting switch to receive a touch/press signal of the outflow water setting switch to enter a calibration setting mode, so as to set the plurality of quantitative outflow water gear positions selected by the flow quantity selecting switch as a calibrated outflow water gear position,
  the outflow water control switch is connected to the control chip,
  after the calibrated outflow water gear position is selected through the flow quantity selecting switch, the control chip controls the outflow water valve to be opened after receiving a touch/press signal of the outflow water control switch,
  when a number of rotations of the flow meter reaches an initial set value, the control chip controls the outflow water valve to be closed, and
  an actual outflow water quantity and a difference value between a set outflow water quantity of the one of the plurality of quantitative outflow water gear positions and the actual outflow water quantity are obtained, so that the calibrated outflow water gear position is set based on the actual outflow water quantity and the difference value.

12. The outflow water faucet according to claim 11, wherein:
the outflow water setting switch and the outflow water control switch are independently arranged.

13. The outflow water faucet according to claim 11, wherein:
the outflow water setting switch and the outflow water control switch are a same switch.

14. The outflow water faucet according to claim 11, comprising:
a calibration module for inputting the difference value, wherein:
  the calibration module comprises a positive difference value setting switch for increasing an outflow water quantity and a negative difference value setting switch for reducing the outflow water quantity, or
  the calibration module comprises a touch screen.

15. The method for calibrating outflow water of the quantitative outflow water faucet, based on the method for setting the calibrated outflow water according to claim 10, wherein the outflow water setting switch and the outflow water control switch are independently arranged.

16. The method for calibrating outflow water of the quantitative outflow water faucet, based on the method for setting the calibrated outflow water according to claim 10, wherein:
the outflow water setting switch and the outflow water control switch are a same switch,
before entering the calibration setting mode, the method further comprises:
  judging a duration of the touch/press signal of the outflow water setting switch; and
  when the duration of the touch/press signal of the outflow water setting switch is greater than or equal to a first duration, entering the calibration setting mode,
before controlling the outflow water valve to be opened, the method further comprises:
  judging a duration of the touch/press signal of the outflow water control switch; and
  when the duration of the touch/press signal of the outflow water control switch is less than a second duration, controlling the outflow water valve to be opened; and
the first duration is greater than or equal to the second duration.

17. The method for calibrating outflow water of the quantitative outflow water faucet, based on the method for setting the calibrated outflow water according to claim 10, wherein:
before setting the calibrated set value of the calibrated outflow water gear position based on the actual outflow water quantity and the difference value, the method further comprises:
  receiving the touch/press signal of the outflow water setting switch again.

18. The method for calibrating outflow water of the quantitative outflow water faucet, based on the method for setting the calibrated outflow water according to claim 17, wherein:
the outflow water setting switch and the outflow water control switch are a same switch,
before entering the calibration setting mode, the method further comprises:
  judging a duration of the touch/press signal of the outflow water setting switch; and
  when the duration of the touch/press signal of the outflow water setting switch is greater than or equal to a first duration, entering the calibration setting mode,
before controlling the outflow water valve to be opened, the method further comprises:
  judging a duration of the touch/press signal of the outflow water control switch; and
  when the duration of the touch/press signal of the outflow water control switch is less than a second duration, controlling the outflow water valve to be opened,
before exiting the calibration setting mode, the method further comprises:
  judging the duration of the touch/press signal of the outflow water setting switch again; and when the duration of the touch/press signal of the outflow water setting switch again is greater than or equal to the first duration, exiting the calibration setting mode, and the first duration is greater than or equal to the second duration.

19. The method for calibrating outflow water of the quantitative outflow water faucet, based on the method for setting the calibrated outflow water according to claim 10, wherein:

after receiving the touch/press signal of the outflow water setting switch, the method further comprises:
controlling a calibration indicator light to display a first color, after receiving the signal for setting the one or more quantitative outflow water gear positions of the flow quantity selecting switch, the method further comprises:
controlling the calibration indicator light to display a second color, and the first color is different from the second color.

20. The method for calibrating outflow water of the quantitative outflow water faucet, based on the method for setting the calibrated outflow water according to claim 17, wherein:

after receiving the touch/press signal of the outflow water setting switch, the method further comprises:
controlling a calibration indicator light to display a first color, after receiving the signal for setting the one or more quantitative outflow water gear positions of the flow quantity selecting switch, the method further comprises:
controlling the calibration indicator light to display a second color, after receiving the touch/press signal of the outflow water setting switch again, the method further comprises:
controlling the calibration indicator light to display a third color, and at least one of the first color, the second color, or the third color is different from the others of the first color, the second color, and the third color.

* * * * *